United States Patent
Beck et al.

(10) Patent No.: US 7,845,476 B2
(45) Date of Patent: Dec. 7, 2010

(54) DECOUPLING STABILIZER AND SYSTEM

(75) Inventors: Jeremy M. Beck, Evanston, IL (US);
Jason K. Trotter, Des Plaines, IL (US);
Dennis M. Mark, Palatine, IL (US);
Robert K. Dutzi, Palatine, IL (US); Eric B. Jipp, Elkport, IA (US)

(73) Assignee: Illinois Tool Works Inc., Glenview, IL (US)

( * ) Notice: Subject to any disclaimer, the term of this patent is extended or adjusted under 35 U.S.C. 154(b) by 1150 days.

(21) Appl. No.: 11/503,813

(22) Filed: Aug. 14, 2006

(65) Prior Publication Data
US 2007/0045978 A1 Mar. 1, 2007

Related U.S. Application Data

(60) Provisional application No. 60/713,101, filed on Aug. 31, 2005.

(51) Int. Cl.
*F16F 9/48* (2006.01)
(52) U.S. Cl. .................. 188/284; 188/299.1; 267/71
(58) Field of Classification Search ............. 188/284, 188/299.1, 300; 267/70–72
See application file for complete search history.

(56) References Cited

U.S. PATENT DOCUMENTS

| 198,275 | A | * | 12/1877 | Chase | 267/70 |
| 3,979,109 | A | * | 9/1976 | Ishida | 293/124 |
| 4,575,058 | A | * | 3/1986 | Daraz | 267/70 |
| 6,059,276 | A | | 5/2000 | Dutzi et al. | |
| 6,481,732 | B1 | | 11/2002 | Hawkins et al. | |
| 6,637,757 | B2 | | 10/2003 | Ignatius et al. | |
| 6,659,475 | B2 | | 12/2003 | Clements et al. | |
| 7,607,675 | B2 | * | 10/2009 | Iwasaki | 280/276 |
| 2009/0236781 | A1 | * | 9/2009 | Born | 267/64.12 |

FOREIGN PATENT DOCUMENTS

DE 102004018701 11/2005

* cited by examiner

*Primary Examiner*—Bradley T King
(74) *Attorney, Agent, or Firm*—Mark W. Croll; Paul E. Donovan (57) ABSTRACT

A roll stabilizer for a vehicle includes a resilient member operatively connected between a movable end and a fixed end, and structure for activating and deactivating operation of the stabilizer by affecting compression of the resilient member.

41 Claims, 9 Drawing Sheets

DECOUPLING STABILIZER AND SYSTEM

CROSS-REFERENCE TO RELATED APPLICATIONS

The present regular United States patent application claims the benefits of U.S. Provisional Application Ser. No. 60/713,101 filed Aug. 31, 2005.

FIELD OF THE INVENTION

The present invention relates generally to suspension systems on motor vehicles, and, more particularly to stabilizer systems provided to inhibit roll of the vehicle.

BACKGROUND OF THE INVENTION

A driver may cause a vehicle to undergo a hard turn, a quick turn, or a series of hard and quick turns when encountering various driving conditions and situations. Such conditions can be experienced during high speed maneuvers, which may occur on freeway entrance ramps, merging lanes and the like. Quick maneuvers also can occur to avoid accidents or objects in the roadway. When experiencing a hard, quick turn the vehicle body tends to elevate on one side and lower on the opposite side very suddenly. This condition is referred to as vehicle body roll. High profile vehicles such as trucks, sports utility vehicles, vans, all-terrain vehicles (ATV's) and the like experience roll conditions more readily than lower profile vehicles, such as passenger cars.

A variety of suspension and stabilizer systems have been used on vehicles of all types to improve passenger comfort and driving stability. Primary suspension system components can include springs and/or dampers providing spring force to suspend the vehicle body, controlling a single wheel assembly and movement relative to the vehicle frame. Primary suspension systems provide only minimal resistance to vehicle body roll.

Roll stabilizer systems provide spring force to return the vehicle body to a neutral position or condition when forces from sudden vehicle movements have caused the body to lean one direction or another. Accordingly, stabilizer systems operate to return the vehicle body from a roll condition to a neutral condition. Several types of stabilizer systems are known.

Torsion bar stabilizer systems have a stabilizer bar as a tension spring and links in series attached to the primary suspension system and vehicle frame. Single compensating stabilizer systems have one anti-roll compensator attached to the primary suspension via a bell crank or the like on each control arm. A dual compensating linear stabilizer system has two anti-roll compensators attached to the primary suspension with two bell cranks on each control arm, with each compensator attached to an upper bell crank on one control arm and to a lower bell crank on the other control arm.

Stabilizer systems as described have achieved acceptance and operate effectively to return the vehicle to a neutral condition when vehicle body roll has been experienced.

For typical street and highway driving conditions it is desirable that a stabilizer system be always operating. However, off-road vehicles, including trucks, ATV's and the like, can be operated in severe terrain wherein one or more wheel may be severely displaced with respect to the other wheels at slow speeds. Commonly, operation in the most severe terrain conditions is performed at low speeds. It is desirable in some situations to operate without a stabilizer system. Without the stabilizer, the wheels and body can move naturally without interference or resistance from spring members in the stabilizer system. However, these same vehicles also may be operated on highways or in other high speed conditions. The high profiles of such vehicles can result in the vehicle being more prone to roll than other vehicles. Accordingly, it is desirable that such vehicles have stabilizer systems for such high speed operation; however, operation of the stabilizer system during off-road maneuvers may be undesirable. Disconnecting or removing stabilizer systems when vehicles are taken off road has been difficult and time consuming.

Accordingly, what is needed is a stabilizer system that can be decoupled or re-coupled quickly and easily, to be active or inactive as the operator desires.

SUMMARY OF THE INVENTION

The present invention provides a variety of structures whereby stabilizer systems can be placed in active, operating conditions and inactive, non-operating conditions as desired.

In one aspect thereof, the present invention provides a vehicle stabilizer with a housing having first and second end caps on opposite ends thereof; a fixed end secured relative to the first end cap; a movable end connected to an axially movable rod. The rod extends through the second end cap and into the housing. A resilient member is disposed on the rod in the housing. End stops are provided at opposite ends of the housing. First and second abutment members are provided at opposite ends of the resilient member, between the end stops and opposite ends of the resilient member. An adjustment means is provided for selectively establishing engagement and disengagement between the end stops and the abutment members upon axial movement of the rod.

In another aspect thereof, the present invention provides a vehicle stabilizer with a fixed end and a movable end. A spring means is operatively connected between the fixed end and the movable end and has an associated relationship with the movable end to effect compression of the spring means upon the movable end being placed in compression and in tension. A selective deactivating means selectively disconnects and connects the associated relationship between the movable end and the spring means.

In a still further aspect thereof, the present invention provides a vehicle stabilizer with a housing having first and second end caps on opposite ends thereof, the housing being rotatable relative to the end caps. A fixed end is secured relative to the first end cap, and a movable end is connected to an axially movable rod extending through the second end cap and into the housing. A resilient member is disposed on the rod in the housing, and end stops are provided at opposite ends in the housing. First and second washers are provided on the rod at opposite ends of the resilient member. The end stops are connected to the housing and have openings axially there in. The openings in the end stops each include a central portion and spaced channels outwardly from the central portion. The first and second washers have peripheral shapes including lobes. The peripheral shapes are of size and configuration to slide into the openings in the end stops with the housing and the end stops in one rotated position, and the peripheral shapes are of size and configuration to abut the end stops with the housing and the end stops in an other rotated position.

An advantage of the present invention is providing a stabilizer system for vehicles that can be rendered operative or inoperative selectively, in a convenient and rapid manner.

Another advantage of the present invention is providing a decoupling stabilizer system useful for off-road vehicles to render stabilizer systems operative and inoperative selectively.

Another advantage of the present invention is providing decoupling stabilizer systems for vehicle stabilizers that can be operated manually or automatically and on stabilizer systems of different types.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 1:
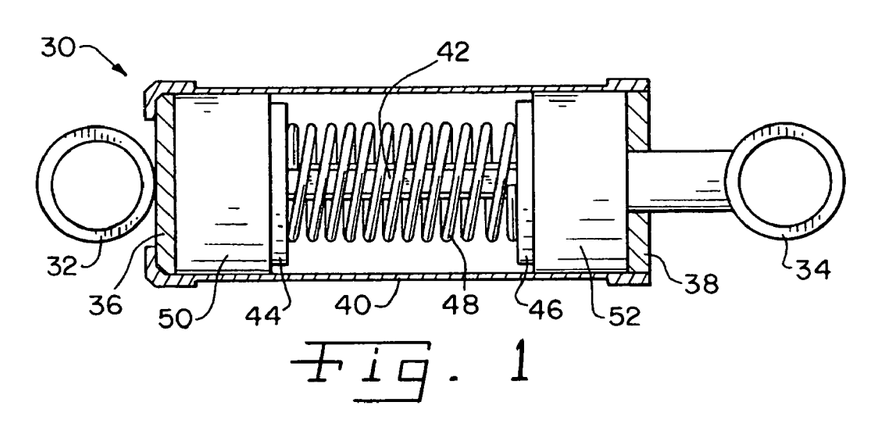
FIG. 1 is a cross-sectional view of a decoupling stabilizer in accordance with the present invention.

Referring now more specifically to the drawings and to FIG. 1 in particular, a decoupling stabilizer 30 is shown. Stabilizer 30 includes a fixed end 32 and a movable end 34 configured for attachment in a vehicle, in a manner and by structure that those skilled in the art will readily understand. For example, each fixed end 32 and a movable end 34 can include a clevis or other structure for attachment within a vehicle. Stabilizer 30 can be provided of different size and general shape for use in vehicles of different types, including for example, ATVs and other off-road vehicles.

Stabilizer 30 includes first and second end caps 36 and 38, respectively and a rotatable outer housing 40. Housing 40 is rotatable relative to fixed end 30 and movable end 32, which is axially movable relative to fixed end 32 and housing 40. A rod 42 is connected to movable end 34 and extends into housing 40 through end cap 38. Within housing 40, first and second spaced abutment bodies such as washers 44, 46 are disposed on rod 42. A spring member 48 is disposed on rod 42, between washers 44, 46. While illustrated in the exemplary embodiment as a helical spring 48, those skilled in the art should readily understand that spring 48 can be a resilient, rubber-like member of natural or synthetic rubbers, or a resilient, spring-member of structures other than the helical spring shown.

End stops 50, 52 are disposed in housing 40, outwardly of washers 44, 46 respectively. Accordingly, end stop 50 is disposed between end cap 36 and washer 44 and end stop 52 is disposed between end cap 38 and washer 46. End stops 50, 52 are connected to housing 40 and are rotatable together with housing 40 relative to end caps 36 and 38, respectively.

Figure 2:
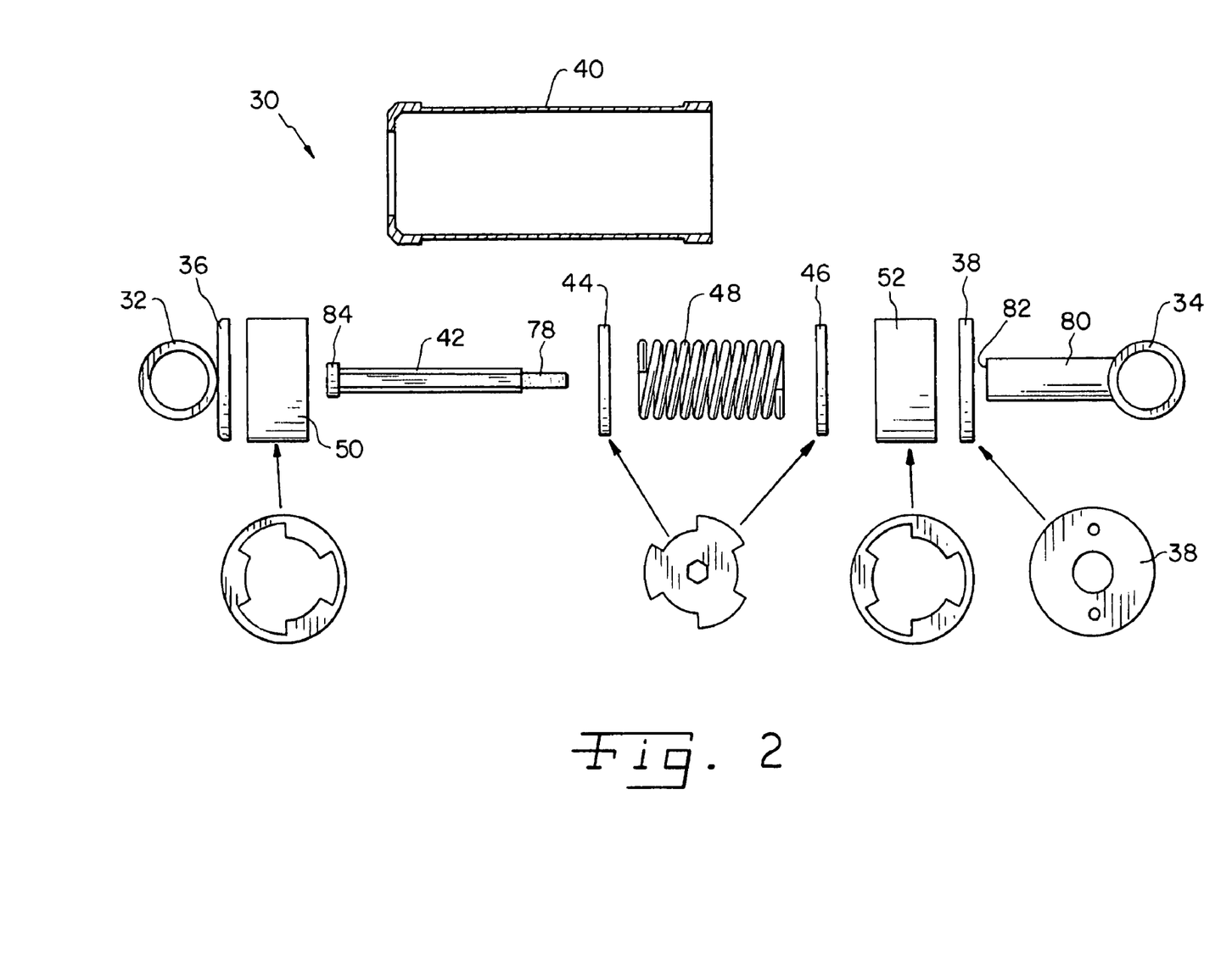
FIG. 2 is an exploded view of the decoupling stabilizer shown in FIG. 1.
Figure 3:
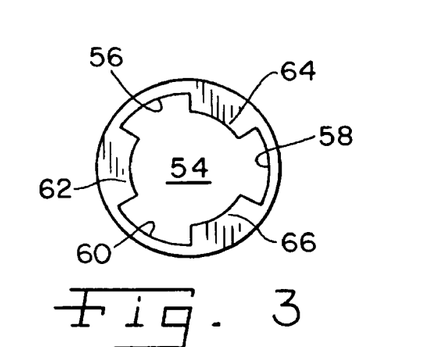
FIG. 3 is a plan view of one of the fixed end members used in the decoupling stabilizer of FIGS. 1 and 2.

With reference now to FIGS. 2 and 3, end stops 50, 52 will be described more fully. Each end stop 50, 52 is a substantially cylindrical body having a central opening 54. Opening 54 has a center portion and defines three axial channels 56, 58 and 60 of greatest radial distance from an axial center of opening 54. Channels 56, 58 and 60 are spaced one from another, and are separated by curved axial lands 62, 64, 66.

Figure 4:
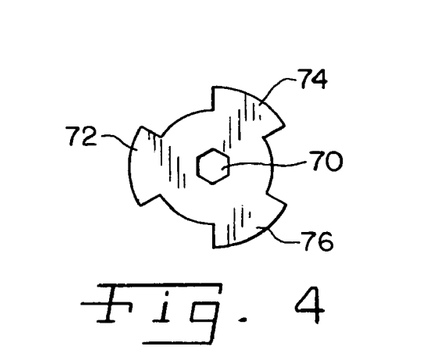
FIG. 4 is a plan view of an internal washer from the decoupling stabilizer shown in FIGS. 1 and 2.

With respect now to FIGS. 2 and 4, washers 44 and 46 will be described in greater detail. Essentially, each washer 44 and washer 46 has a shape that is complementary to the shapes of openings 54 in end stops 50, 52. Accordingly, washers 44 and 46 have a relatively small central hole 70 through which rod 42 extends. Hole 70 is shaped together with an exterior surface of rod 42 so that washers 44, 46 are not rotatable on rod 42. In the exemplary embodiment, hole 70 and rod 42 are six-sided, but other non-round shapes also can be used. Outwardly of hole 70, washers 44, 46 otherwise are substantially solid bodies, having three radially outwardly extending lobes 72, 74, 76 of a size and shape to fit within channels 56, 58 and 60 respectively. Thus, depending on the relative rotational positions of end stops 50, 52 relative to washers 44, 46; lobes 72, 74 and 76 are aligned with either lands 62, 64, 66 or channels 56, 58 and 60.

Rod 42 is connected to and moves axially with movable end 34, as movable end 34 is placed in compression or tension within a vehicle suspension system in which stabilizer 30 is installed. To this end, rod 42 in the exemplary embodiment is provided with a threaded end 78 (FIG. 2) engaged with a tube 80 connected to movable end 34. Tube 80 defines an abutment 82 at an end thereof, which is of greater diameter than hole 70 in washer 46. Accordingly, washer 46 cannot slide onto or along tube 80. At an end opposite threaded end 78, rod 42 is provided with a head 84 larger than hole 70 of a washer 44. Accordingly, washer 44 can slide along rod 42, but not past head 84.

To activate and deactivate stabilizer 30, housing 40 is rotated relative to end caps 36, 38, which are rotatably restrained by the connection thereof to ends 32 and 34 that are connected within a vehicle suspension system. Washers 44, 46 are not rotatable relative to rod 42, and thus also stay in fixed rotational positions as housing 40 is rotated. As mentioned previously, end stops 50, 52 are connected to and rotate with housing 40. Accordingly, in a first rotational position of housing 40, lobes 72, 74, 76 of washers 44, 46 are aligned with lands 62, 64 and 66 of end stops 50, 52. If movable end 34 is compressed toward fixed end 32, washer 44 is held against end stop 50, washer 46 abuts abutment 82 and further axial movement compresses spring 48 as washer 46 is pushed against it. As compressive force on movable end 34 is released, spring 48 urges washer 46 outwardly, thus moving rod 42 and movable end 34 back to the neutral position as shown in FIG. 1. Conversely, if movable end 34 is placed in tension, washer 46 abuts against end stop 52 and washer 44 is drawn against spring 48 by head 84. Spring 48 again is compressed between washers 44, 46. Again, when tension forces are released, spring 48 urges washer 44 outwardly, and stabilizer 30 returns to the neutral condition shown in FIG. 1. In the orientations just described, with end stops 50, 52 rotated into positions in which lands 62, 64, 66 and lobes 72, 74, 76 are aligned, stabilizer 30 is in an activated state and functions both in compression and tension from movement of movable end 34.

To deactivate stabilizer 30, housing 40 is rotated, thereby rotating end stops 50, 52 that are connected to housing 40. In a second rotational position of housing 40, lobes 72, 74 and 76 align with channels 56, 58 and 60. If movable end 34 is placed in compression, washer 46 is again urged against spring 48 by advancing tube 80. However, as axial force is applied against washer 44 via spring 48, washer 44 slides into end stop 50, with lobes 72, 74 and 76 sliding axially along channels 56, 58 and 60. Spring 48 is not compressed and instead a portion thereof slides into end stop 50. Similarly, if movable end 34 is placed in tension, washer 46 and an opposite end portion of spring 48 slide into end stop 52, and again spring 48 is not compressed. Accordingly, stabilizer 30 is effectively decoupled from the suspension system in which it is installed, and does not perform.

Figure 5:
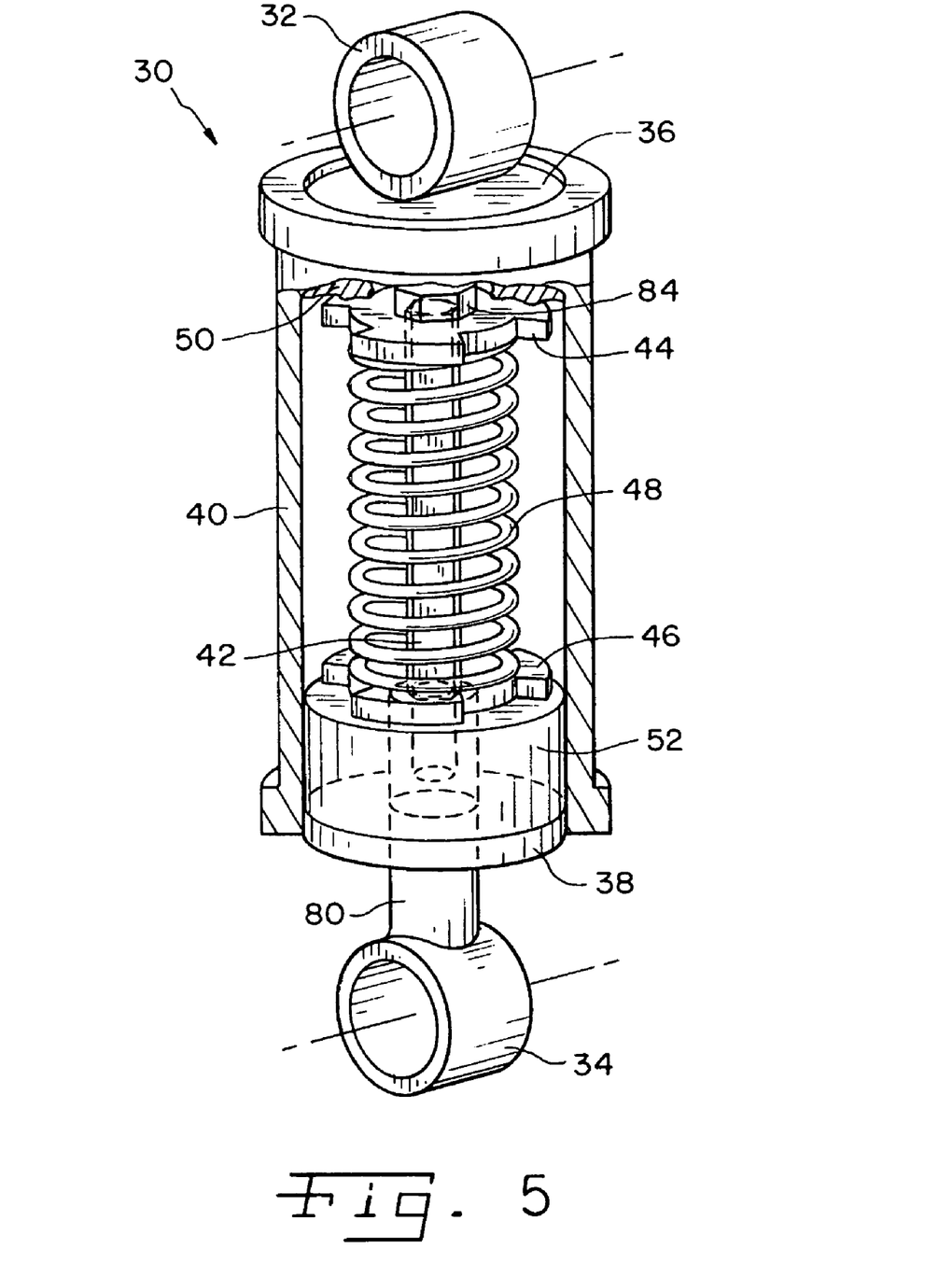
FIG. 5 is a perspective view, partially broken away, of the decoupling stabilizer shown in the previous drawings.
Figure 8:
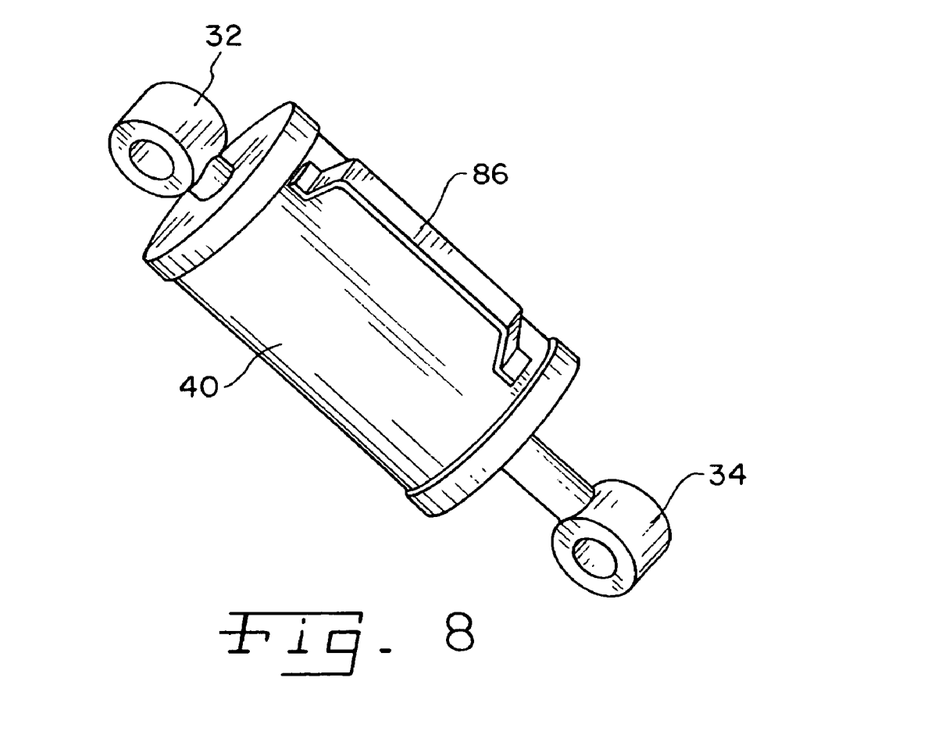
FIG. 8 is a perspective view of a modified form of the decoupling stabilizer shown in FIGS. 1-5.

It should be understood that adjustment of stabilizer 30 can be manual or automatic. For example, as shown in FIGS. 1, 2 and 5, housing 40 can simply be grasped by hand and rotated to move the relative positions of end stops 50 and 52 relative to washers 44 and 46. FIG. 8 illustrates an embodiment in which a handle 86 is provided on housing 40 to facilitate grasping and rotating between the coupled and decoupled positions.

Figure 6:
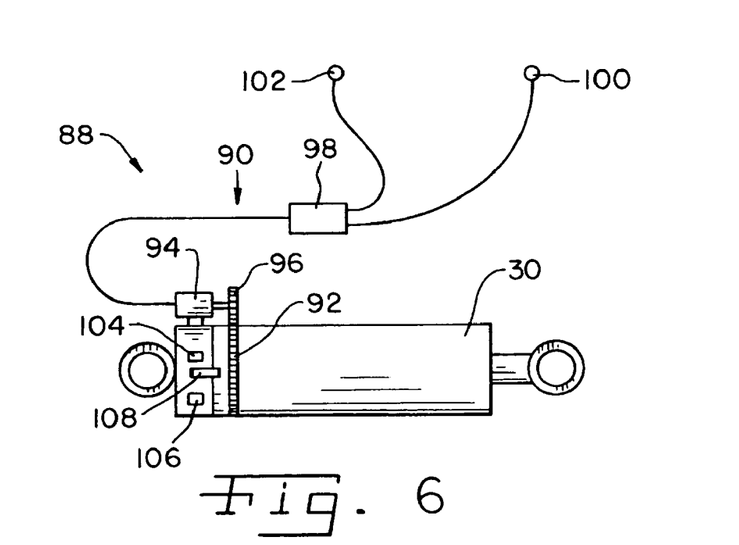
FIG. 6 is an elevational view illustrating a decoupling stabilizer system of the present invention, including a decoupling stabilizer and a control and operating system therefore.

Automatic controls also can be used to activate and deactivate stabilizers of the present invention. FIG. 6 illustrates a decoupling stabilizer system 88 having a control and operating system 90. A stabilizer 30, as described previously herein, is provided with gear teeth in the form of a gear rack 92 on housing 40. A drive motor 94 has a drive gear 96 engaged with rack 92. A controller 98 is coupled to motor 94. Signal inputs to controller 98 can be provided from a push-button or other selector 100 available to the operator of the vehicle. Alternatively or additionally, a speed sensor 102 coupled with the transmission (not shown) or other system in the vehicle can be used to generate signal inputs to controller 98, to initiate control signals to operate motor 94. Motor 94 is a reversing motor so that drive gear 96 can be rotated in opposite directions upon the receipt of control signals from controller 98. As drive gear 96 is rotated while engaged with rack 92, housing 40 is rotated one direction or the other, depending on the direction of operation for motor 94.

Various types of distance measuring and/or position determining processes and devices can be used to ensure accurate positioning of housing 40 for both coupled and decoupled positions. Mechanical stops 104, 106 can be provided on one or the other end cap, and a gauge bar 108 connected to housing 40 traverses between stops 104 and 106 as housing 40 is rotated. Stops 104 and 106 establish physical restrictions and prevent over rotation of housing 40 in either rotational direction and provide a visual queue when housing 40 is properly rotated and gauge bar 108 is engaged against one or the other stop 104, 106.

Figure 7:
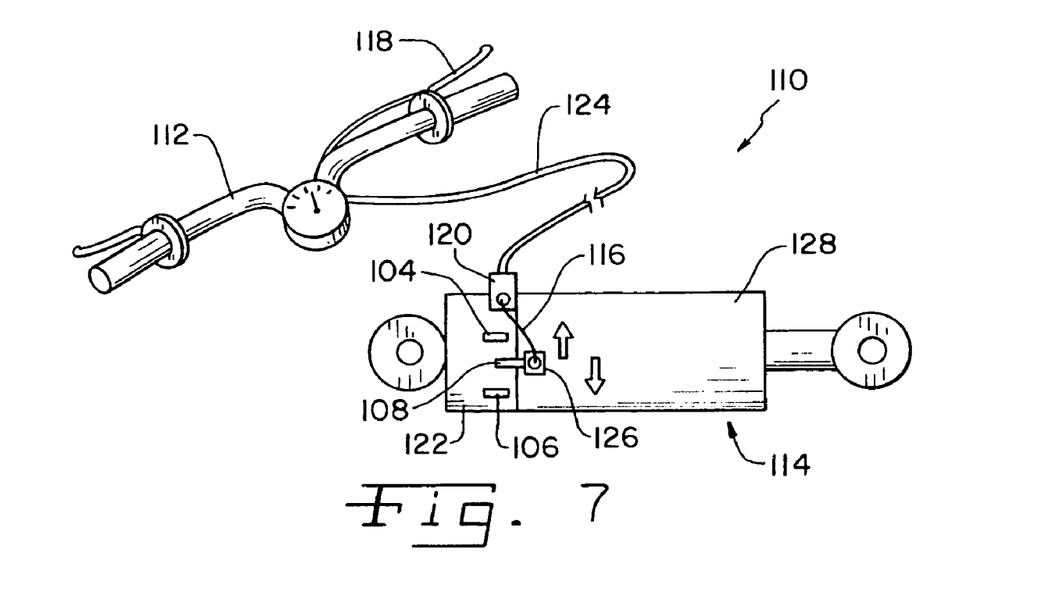
FIG. 7 is a schematic illustration of yet another control and operating system in a decoupling stabilizer system of the present invention.

FIG. 7 illustrates yet another mechanical variation in which the stabilizer can be coupled and decoupled quickly during operation. Decoupling stabilizer system 110 is suitable for use on an ATV or the like having a handlebar 112. A stabilizer 114 includes stops 104, 106 and gauge bar 108 as described previously. Operation is via a cable 116 and a lever 118. An anchor block 120 on an end cap 122 secures an end of a sheath 124 through which cable 116, in the nature of a stiff wire, is slidably disposed. One end, cable 116 is secured to lever 118, and an opposite end cable 116 is secured to a fastener 126 on housing 128. Housing 128 is biased toward one or the other position, in the direction to provide tension on cable 116. In this embodiment, coupling and decoupling of stabilizer system 110 is accomplished similarly to the clutch and brake controls commonly found on ATV's, bicycles and the like. Squeezing lever 118 against handlebar 112 pulls cable 116 and rotates housing 128. When lever 118 is released, spring biasing of housing 128 returns it to an opposite rotational position. The operation of decoupling stabilizer system 110 is both intuitive and easy. Operation can be performed while moving and riding the vehicle. As a result, a rider of an ATV can coordinate the operation of stabilizer system 110 to the riding conditions experienced. Stabilizer system 110 can be deactivated when needed and can be activated when conditions are such that performance of stabilizer system 110 is advantageous.

Other structures can be used for physically decoupling a stabilizer in accordance with the present invention. FIGS. 9-23 illustrate further embodiments for decoupling stabilizers in accordance with the present invention.

Figure 9:
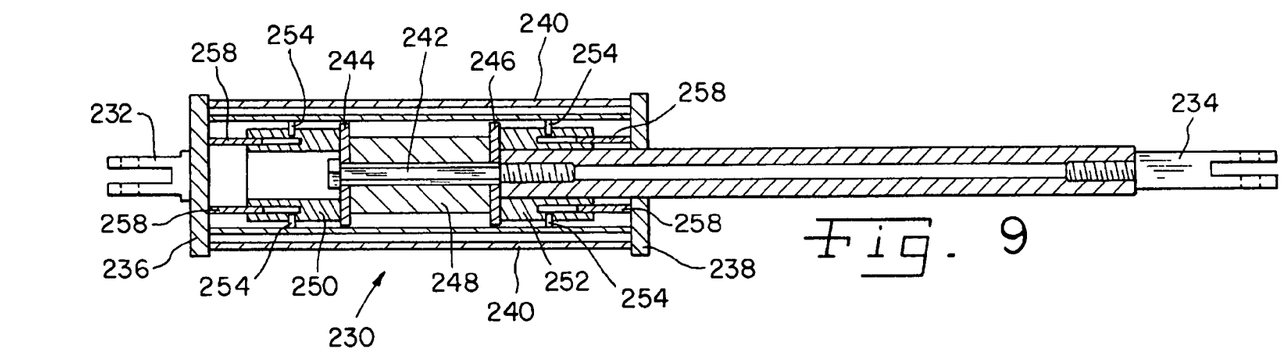
FIG. 9 is a cross-sectional view of another embodiment of a decoupling stabilizer in an engaged condition.
Figures 10, 11:
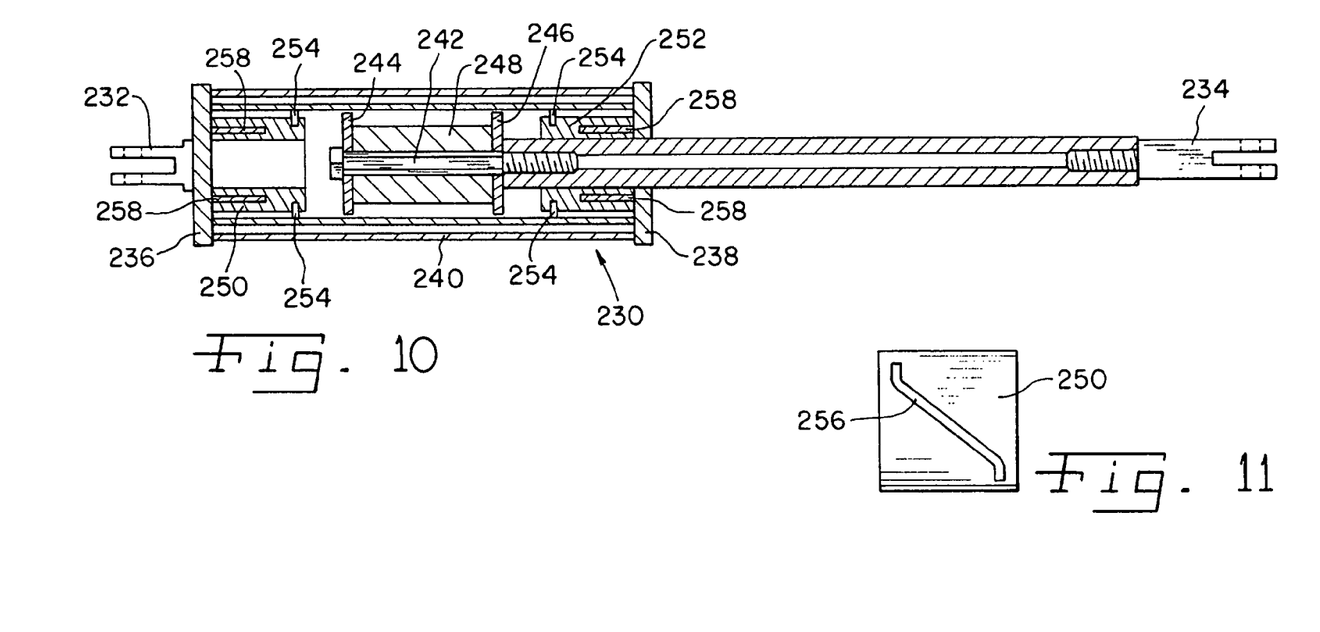
FIG. 10 is a cross-sectional view similar to that of FIG. 9, but illustrating the decoupling stabilizer in a disengaged condition.
FIG. 11 is an elevational view of part of the decoupling stabilizer shown in FIGS. 9 and 10.

FIGS. 9-11 illustrate a decoupling stabilizer 230 which includes a fixed end 232 and a movable end 234. End caps 236, 238 are provided on opposite ends of a rotatable housing 240. A rod 242 is provided in the interior of housing 240 and has first and second washers 244, 246 mounted thereon with a resilient, compressible member 248 therebetween. Resilient compressible member 248 acts as a spring to retain its original shape and size when compressed. End stops 250 and 252 are provided outwardly of first and second washers 244, 246 respectively. Accordingly, end stop 250 is provided between first washer 244 and end cap 236 and second end stop 252 is provided between second washer 246 and end cap 238.

As thus far described, decoupling stabilizer 230 is substantially similar to decoupling stabilizer 30 described previously herein. As shown in FIG. 9, stabilizer 230 is engaged, with end stops 250, 252 held against first washer 244 and second washer 246, respectively. A plurality of pins 254 extend from housing 240 inwardly and are received in grooves 256 of end stops 250, 252. FIG. 11 illustrates one such groove 256 in end stop 250; however, it should be understood that one such groove 256 is provided for each pin 254. The shape of groove 256 is such that as housing 240 is rotated, causing pins 254 to rotate and traverse along groove 256, end stops 250, 252 are moved axially within housing 240. Accordingly, in a first rotationally adjusted position of housing 240, end stops 250, 252 are held against washers 244, 246, respectively, as illustrated in FIG. 9. In this position, decoupling stabilizer 230 is in an activated state and will operate to provide a damping effect. In a second rotationally adjustable position of housing 240, end stops 250, 252 are moved axially outwardly in housing 240, and are held against end caps 236, 238 respectively. Accordingly, as movable end 234 is moved one direction or the other, the inner assembly of washers 244, 246 and resilient member 248 move freely within housing 240, between end stops 250, 252. Since no compression is applied on resilient member 248, stabilizer 230 is effectively decoupled. The decoupled condition of stabilizer 230 is illustrated in FIG. 10. To guide the axial movement of end stops 250 and 252, and to prevent the rotation of end stops 250, 252; a plurality of axial guide pins 258 are slidingly received in each of end stops 250, 252.

Figure 12:
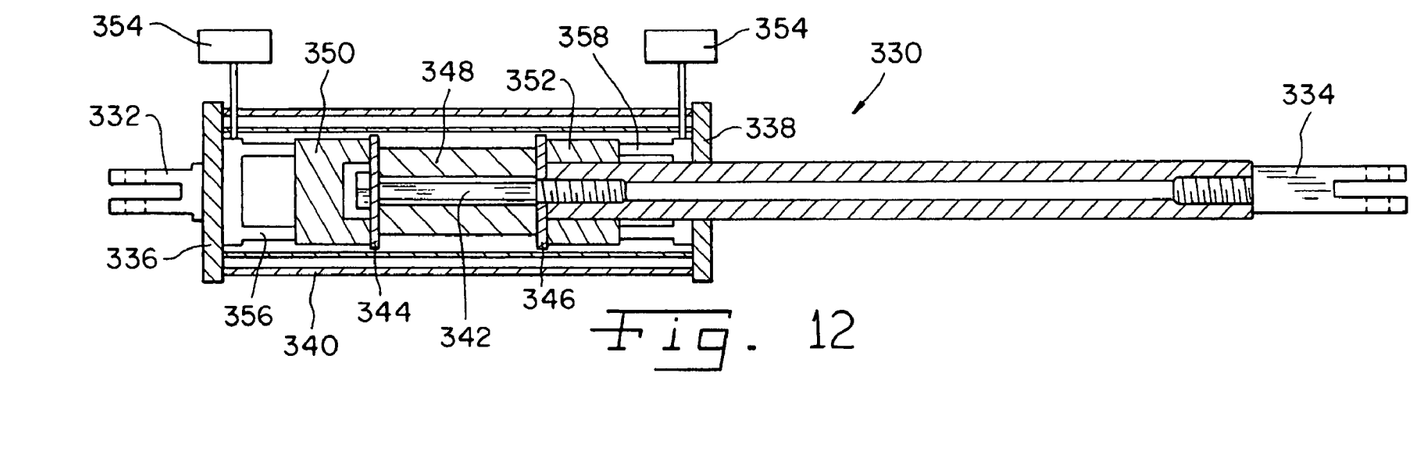
FIG. 12 is a cross-sectional view of still another decoupling stabilizer of the present invention, illustrated in an engaged condition.
Figure 13:
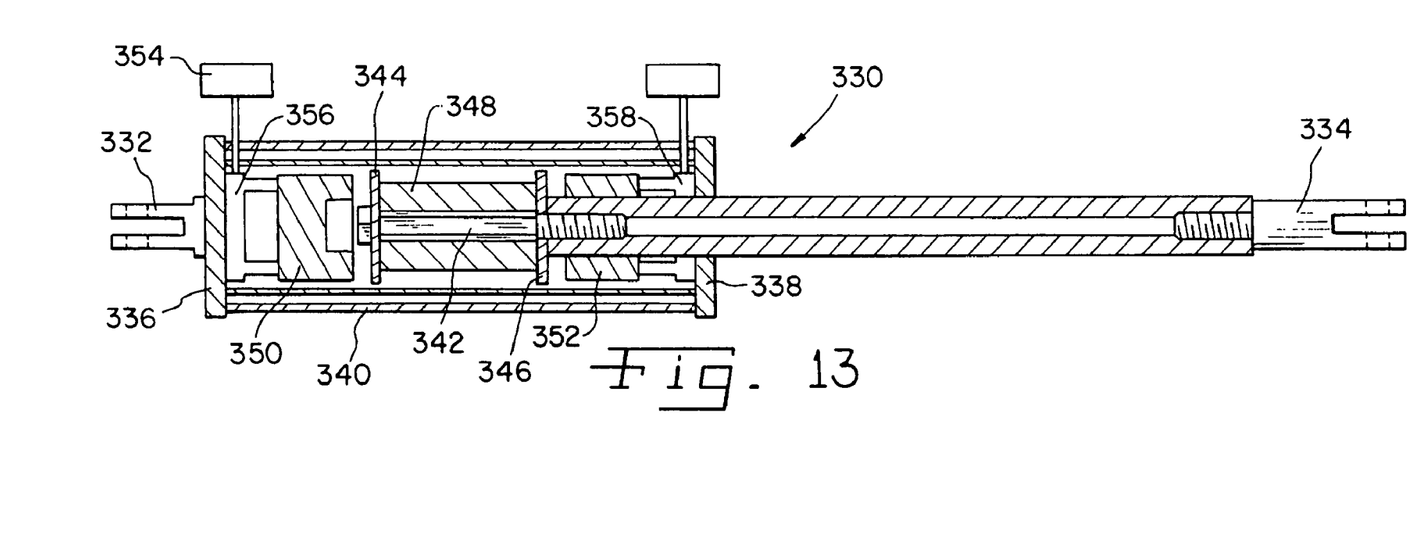
FIG. 13 is a cross-sectional view similar to that of FIG. 12, but illustrating the decoupling stabilizer in a disengaged condition.

Yet another decoupling stabilizer 330 is shown in FIGS. 12 and 13. Stabilizer 330 includes a fixed end 332 and a movable end 334 and a movable end 334. End caps 336, 338 are provided on opposite ends of a rotatable housing 340. A rod 342 is provided in the interior of housing 340 and has first and second washers 344, 346 mounted thereon, with a resilient compressible member 348 therebetween. Resilient compressible member 348 acts as a spring to retain its original shape and size when compressed. End stops 350 and 352 are provided outwardly of first and second washers 344, 346 respectively. Accordingly, end stop 350 is provided between first washer 344 and end cap 336, and second end stop 352 is provided between second washer 346 and end cap 338.

Stabilizer 330 differs in the manner of advancing end stops 350, 352 within housing 340. one or more hydraulic fluid source 354 is connected to hydraulic actuators 356, 358 associated with end stops 350, 352, respectively. Thus, in known manner, hydraulic actuators 356, 358 either advance end stops 350, 352 toward washers 344, 346, respectively, or away from washers 344, 346 and against end caps 336, 338 respectively. Thus, with end stops 350, 352 advanced against washers 344, 346, respectively, stabilizer 330 is in an activated condition as illustrated in FIG. 12. With end stops 350, 352 moved away from washers 344, 346 stabilizer 330 is in a deactivated condition, as illustrated in FIG. 13.

Figure 14:
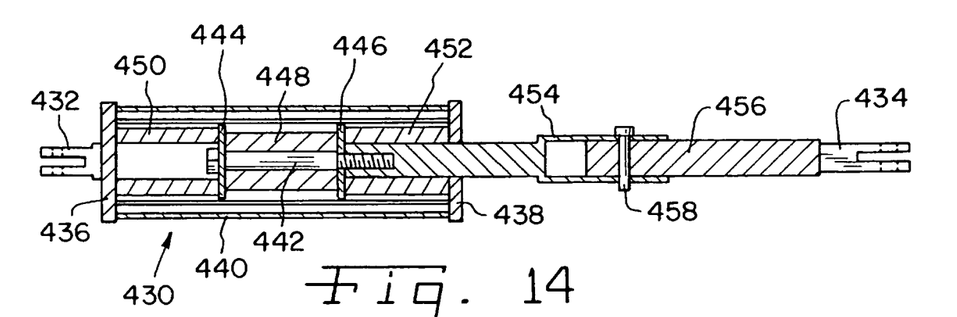
FIG. 14 is a cross-sectional view of a still further decoupling stabilizer system of the present invention.

Yet another decoupling stabilizer 430 is illustrated in FIG. 14. Stabilizer 430 includes a fixed end 432 and a movable end 434. End caps 436 and 438 are provided at opposite ends of a housing 440, which can be fixed relative to end caps 436, 438. A rod 442 in housing 440 has first and second washers 444, 446 disposed thereon. A resilient member 448 is disposed on rod 442, between washers 444 and 446. Resilient compressible member 448 acts as a spring to retain its original shape and size when compressed. End stops 450 and 452 are provided outwardly of first and second washers 444, 446 respectively. Accordingly, end stop 450 is provided between first washer 444 and end cap 436, and second end stop 452 is provided between second washer 446 and end cap 438. In stabilizer 430, end stops 450 and 452 can remain operationally engaged with and against washers 444 and 446 at all times in that operational disconnect is effected by means other than the positional relationships of end stops 450, 452 and washers 444, 446.

Movable end 434 includes a female portion 454 and a male portion 456 disposed in female portion 454. A pin 458 is provided to fixedly connect female portion 454 and male portion 456, to secure the axial positions of each with respect to the other. Thus, with pin 458 in place, stabilizer 430 is in an active condition, and axial movement of male portion 456 is transferred to female portion 454, initiating the stabilizing performance of resilient member 448 as described with previous embodiments. When 458 is removed, stabilizer 430 is in a de-active condition, and male portion 456 slides freely within female portion 454 without transfer movement to female portion 454, as stabilizer 430 is placed either in compression or tension.

Figure 15:
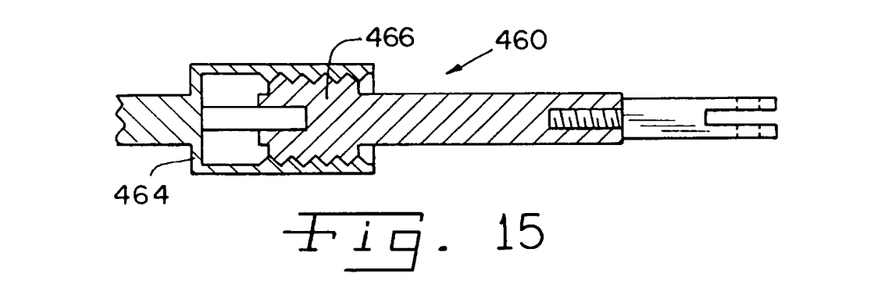
FIG. 15 is a fragmentary cross-sectional view of a still further decoupling stabilizer of the present invention, illustrated in an engaged condition.
Figure 16:
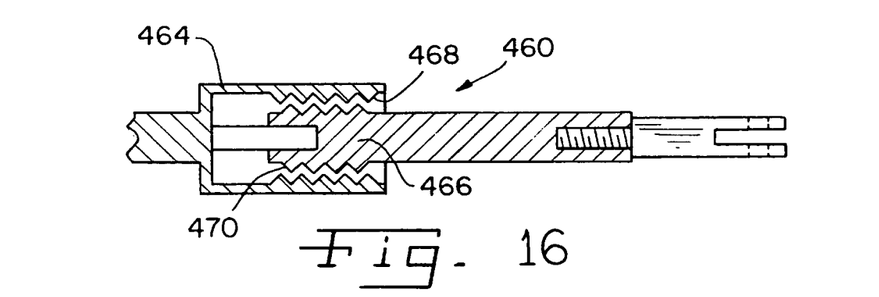
FIG. 16 is a cross-sectional view of the decoupling stabilizer shown in FIG. 15, but illustrating the decoupling stabilizer in a disengaged condition.
Figure 17:
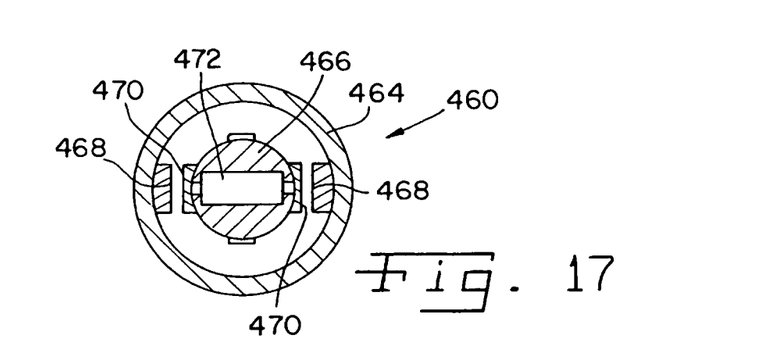
FIG. 17 is an end view of the decoupling stabilizer shown in FIGS. 15 and 16.

FIGS. 15, 16 and 17 illustrate yet another embodiment of a movable end 460 that can be used in decoupling stabilizers of the present invention. A female portion 464 receives a male portion 466 therein. Female portion 464 and male portion 466 have interengaging surfaces 468 and 470, respectively. As best seen in FIG. 17, female portion 464 is provided with two such surfaces 468 and male portion 466 is provided with two complementary and aligned portions 470. A hydraulic or other actuator 472 is provided to extend or retract surfaces 470 of male portion 466. Accordingly, as illustrated in FIG. 15, with surfaces 470 of male portion 466 extended and engaged with surfaces 468 of female portion 464, axial translation of male portion 466 is transferred to female portion 464 through the inter-engagement of surfaces 468 and 470. A stabilizer incorporating movable end 460 in this condition is activated and will function. With surfaces 470 of male portion 466 retracted, male portion 466 is not connected to or engaged with female portion 464 and slides freely therein when placed in either compression or tension. Accordingly, as illustrated in FIGS. 16 and 17 stabilizer 460 is de-active.

Figure 18:
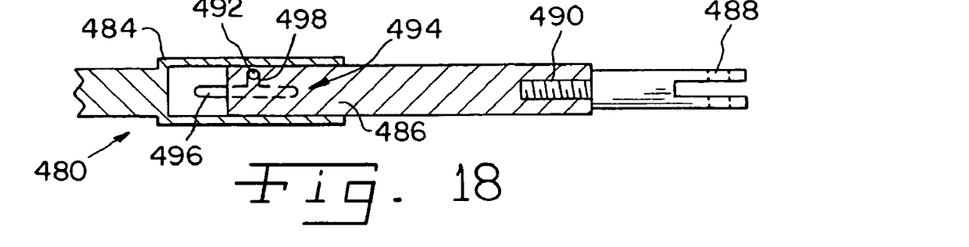
FIG. 18 is a fragmentary elevational view of a decoupling stabilizer in accordance with yet another embodiment of the present invention, shown in an engaged condition.
Figure 19:
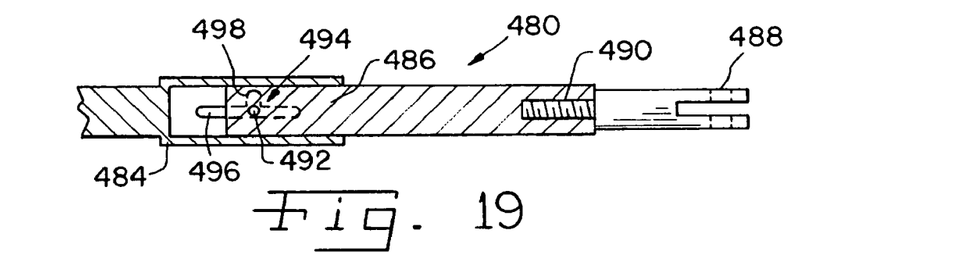
FIG. 19 is a fragmentary view similar to that of FIG. 18, but illustrating the decoupling stabilizer in a disengaged condition.

FIGS. 18 and 19 illustrate yet another fragmentary portion of a movable end 480 including a female portion 484 and a male portion 486 received therein. Male portion 486 is rotatable relative to an attaching fixture 488 of movable end 480 trough a rotatable connection 490. Male portion 486 is provided with an outwardly projecting pin 492, and female portion 484 is provided with an intersecting slot arrangement 494 including an axial slot portion 496 and a circumferential slot segment 498. By rotating male portion 486 relative to female portion 484, pin 492 is received either in axial slot portion 496 or circumferential slot portion 498. As illustrated in FIG. 18, with pin 490 constrained within circumferential slot portion 496, axial movement of male portion 486 and pin 492 connected thereto causes movement of female portion 484 through the engagement of pin 492 against sides of circumferential slot 498. Thus, as illustrated in FIG. 18, stabilizer 480 is in an active condition. Conversely, as depicted in FIG. 19, stabilizer 480 is deactivated, with pin 492 disposed in axial slot 496. As male portion 486 is placed in either compression or tension pin 492 simply traverses along axial slot 496, without causing engagement between male portion 486 and female portion 484. Accordingly, male portion 486 moves freely within female portion 484, and stabilizer 480 is de-active.

Figure 20:
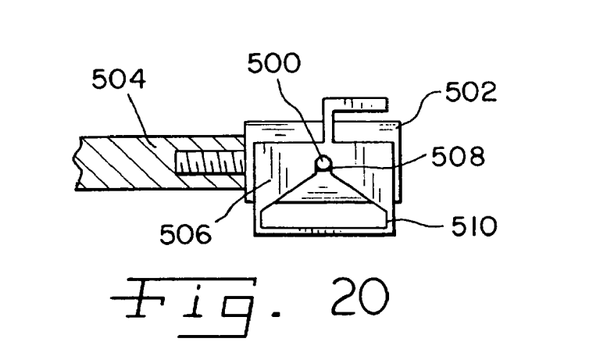
FIG. 20 is a cross-sectional view of yet another decoupling stabilizer of the present invention, shown in an engaged condition.
Figure 21:
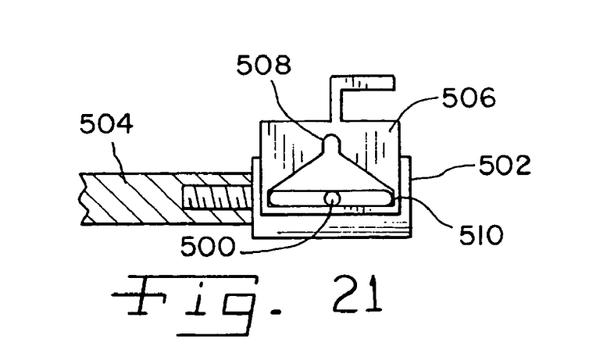
FIG. 21 is a cross-sectional view of the decoupling stabilizer shown in FIG. 20, but illustrating the decoupling stabilizer in a disengaged condition.

FIGS. 20 and 21 illustrate still another embodiment that can be used at either a fixed end or a movable end of a decoupling stabilizer of the present invention. A pin 500 is connected to the vehicle. A retainer box 502 is attached to a stabilizer fixed or moveable end 504. A slider block 506 is depressed to capture pin 500 within a confined slot area 508. When slider block 506 is moved in an opposite direction, upwardly as depicted in FIGS. 20 and 21, pin 500 is received in a large, substantially unconstrained area 510 of slider block 506. Accordingly, as illustrated in FIG. 20, with pin 500 constrained within confined area 508, forces of compression and tension are conveyed between components, rendering the stabilizer active. In the disengaged position illustrated in FIG. 21 forces of compression or tension are not conveyed through pin 50, which slides freely in space 510. Accordingly a stabilizer connected to end 504 is effectively decoupled and de-active. The embodiment shown in FIGS. 20 and 21 may be of advantage for both manual and mechanical operation, and can be provided with a locking mechanism to secure the position of slider block 506 in either the engaged or disengaged conditions.

Figure 22:
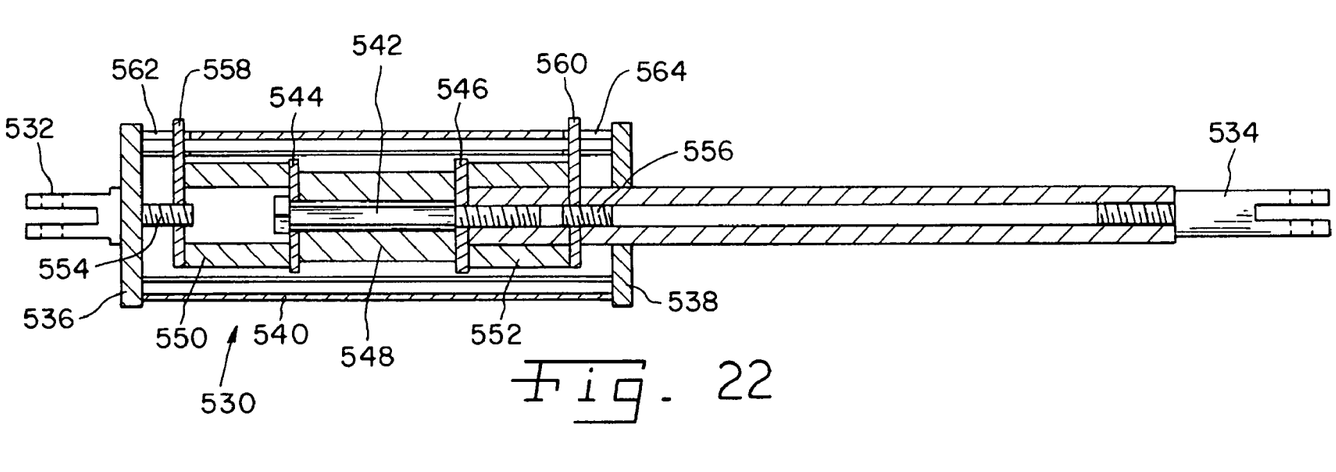
FIG. 22 is a cross-sectional view of a still further embodiment for a decoupling stabilizer of the present invention, illustrating the decoupling stabilizer in an engaged condition.
Figure 23:
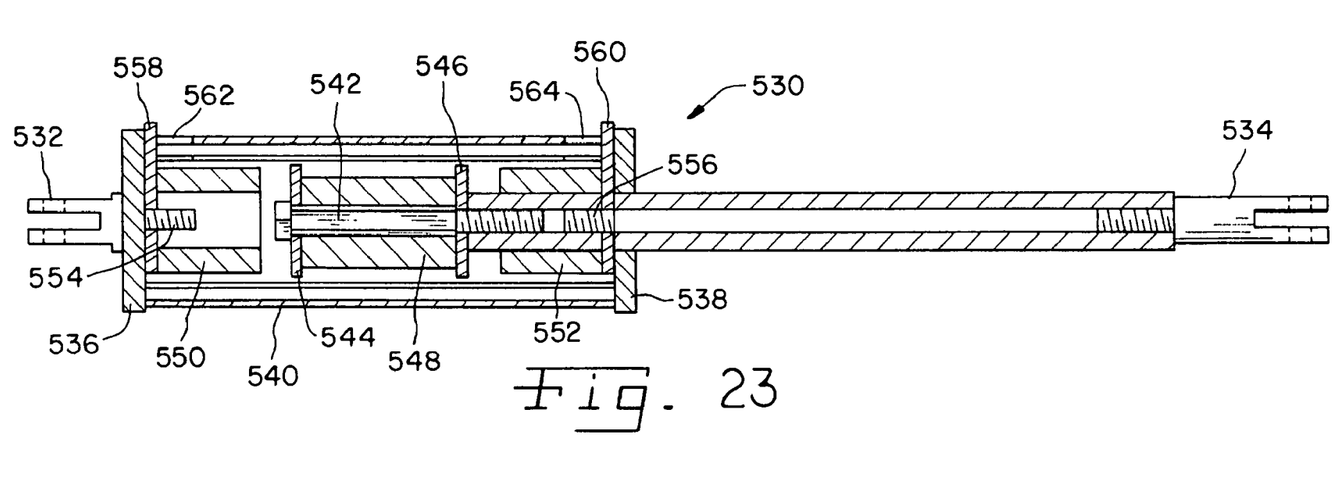
FIG. 23 is a view of decoupling stabilizer shown in FIG. 22, but illustrating the decoupling stabilizer in a disengaged condition.

Yet another decoupling stabilizer 530 is shown in FIGS. 22 and 23. Decoupling stabilizer 530 includes a fixed end 532 and a movable end 534. End caps 536 and 538 are provided at opposite ends of a housing 540. A rod 542, having first and second washers 544, 546 disposed thereon, is provided in housing 540. Resilient spring material 548 is provided between first and second washers 544, 546. End stops 550, 552 are provided outwardly of first and second washers 544, 546, respectively. Threaded studs 554, 556 project inwardly from end caps 536, 538, respectively, and are engaged with end stops 550, 552 in a threaded manner. Levers 558, 560 are connected to end stops 550, 552, respectively and extend outwardly through slots 562, 564 in housing 540. The threaded engagement of end stops 550, 552 on studs 554, 556 can be relatively course such that rotation of end stops 550, 552 via movement of levers 558, 560 in slots 562, 564 causes substantial axial movement of end stops 550, 552 within housing 540. Accordingly, in a first adjusted position, end stops 550, 552 are held against washers 544, 546 as illustrated in FIG. 22, and stabilizer 530 is in an activate condition. With levers 558, 560 in the opposite extreme adjusted positions, end stops 550, 552 are moved away from washers 554, 556 and against end caps 536, 538, respectively. Accordingly, as illustrated in FIG. 23, stabilizer 530 is in a de-active condition.

The present invention as shown and described herein, including equivalents thereof, provides adjustment means for vehicle stabilizers through rotation of stabilizer housings, positional adjustment of the stabilizer end stops and/or interruption of the axial connections between actually movable parts whereby a resilient spring means in the stabilizer is selectively rendered operable or in operable within the vehicle suspension system. Each of the embodiments described herein, and the equivalents thereof, provides a deactivating means whereby the associated relationship between a movable end of the stabilizer and a resilient spring means in the stabilizer is selectively disconnected and connected. As a result, each of the stabilizers disclosed herein, and the equivalents thereof, provides a readily and selectively de-couplable structure whereby the stabilizer can be rendered active or inactive, as desired. Accordingly, stabilizers of the present invention provide advantages for use on vehicles such as four-wheel-drive vehicles, ATVs and the like which at times may be operated on conventional roads at highway speeds, and which at other times may be operated off-road at slow speeds in rugged terrains.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A vehicle stabilizer comprising:
   a housing having first and second end caps on opposite ends thereof;
   a fixed end secured relative to said first end cap;
   a movable end connected to an axially movable rod, said rod extending through said second end cap and into said housing;
   a resilient member disposed on said rod in said housing;
   end stops at opposite ends of said housing;
   first and second abutment members at opposite ends of said resilient member between said end stops and opposite ends of said resilient member; and
   adjustment means for selectively establishing engagement and disengagement between said end stops and said abutment members upon axial movement of said rod.

2. The stabilizer of claim 1, said housing being rotatable about said rod.

3. The stabilizer of claim 2, said housing including a handle on an outer surface thereof.

4. The stabilizer of claim 2, said end stops being connected to said housing for rotation therewith.

5. The stabilizer of claim 4, said end stops defining a shaped opening at least partly therethrough, said shaped opening including a central portion and spaced axial channels of greater radial extent than said central opening; and said abutment members having peripheral shapes including lobes slidable through said spaced axial channels in said end stops when said lobes are aligned with said channels.

6. The stabilizer of claim 5, said end stops defining three said axial channels, and said abutments defining three said lobes.

7. The stabilizer of claim 5, including a control and operating system including a gear on said housing, a motor, and a drive gear connected to said motor for rotation thereby, said drive gear being drivingly engaged with said gear on said housing.

8. The stabilizer of claim 7, including a controller operationally connected to said motor, and a manual selector for initiating operation of said motor via said controller.

9. The stabilizer of claim 7, including a controller operationally connected to said motor, and an input responsive sensor for initiating operation of said motor in response to a condition sensed by said sensor.

10. The stabilizer of claim 7, including physical stops positioned for limiting rotation of said housing.

11. The stabilizer of claim 1, said housing being rotatable about said rod, and said stabilizer including a cable connected to said housing and a lever connected to said cable for pulling said cable and rotating said housing.

12. The stabilizer of claim 11, including physical stops positioned for limiting rotation of said housing.

13. The stabilizer of claim 1, including hydraulic actuators connected to said end stops in a manner to adjust axial positions of said end stops in said housing.

14. The stabilizer of claim 1, said housing being rotatable about said rod and including at least one pin extending toward each said end stop; and a groove in each said end stop receiving a said pin, said groove in each said end stop configured for effecting axial movement of said end stops upon rotation of said housing with said pins in said grooves.

15. The stabilizer of claim 1, said end caps each having a threaded stud projecting inwardly in said housing, said threaded studs threadedly engaged with said end caps; and means for rotating said end stops in said housing and effecting axial movement of a rotated end stop in said housing.

16. The stabilizer of claim 15, including first and second levers connected to said first and second end stops, said first and second levers extending outwardly of said housing through slots in said housing.

17. The stabilizer of claim 1, said adjustment means selectively disconnecting and connecting axially movable components.

18. The stabilizer of claim 17, including a male portion and a female portion, and said adjustment means including means for selectively establishing connection and disconnection between said male portion and said female portion and controlling relative axial movement between said male portion and said female portion.

19. The stabilizer of claim 18, including a pin between said male portion and said female portion.

20. The stabilizer of claim 19, one of said male portion and said female portion defining a pin and the other of said male portion and said female portion defining an engagement block having axially more constricting and axially less constricting regions for receiving said pin.

21. The stabilizer of claim 18, said male portion and said female portion having complementary interengaging surfaces, and one of said surfaces being movable toward and away from the other of said surfaces.

22. The stabilizer of claim 18, one of said male portion and said female portion defining a pin, and the other of said male portion and said female portion defining intersecting axial and circumferential slots for receiving said pin.

23. The stabilizer of claim 18, one of said male portion and said female portion defining a pin and the other of said male portion and said female portion defining an engagement block having axially more constricting and axially less constricting regions for receiving said pin.

24. A vehicle stabilizer comprising:
a fixed end;
a movable end;
spring means operatively connected between said fixed end and said movable end and having an associated relationship with said movable end to effect compression of said spring means upon said movable end being placed in compression and in tension;
end stops at opposite ends of said spring means, and
selective deactivating means for selectively disconnecting and connecting said associated relationship between said movable end and said spring means, said selective deactivating means being means for selectively altering positional relationships between said end stops and said spring means.

25. The stabilizer of claim 24, said selective deactivating means selectively disconnecting and connecting axially movable components.

26. The stabilizer of claim 24, including a male portion and a female portion, and said selective deactivating means including means for selectively establishing connection and disconnection between said male portion and said female portion and controlling relative axial movement between said male portion and said female portion.

27. The stabilizer of claim 26, said selective deactivating means including a pin.

28. The stabilizer of claim 26, said male portion and said female portion having complementary interengaging surfaces, and one of said surfaces being movable toward and away from the other of said surfaces.

29. The stabilizer of claim 26, one of said male portion and said female portion defining a pin and the other of said male portion and said female portion defining intersecting axial and circumferential slots for receiving said pin.

30. The stabilizer of claim 24, said selective deactivating means being means for moving said end stops.

31. The stabilizer of claim 24, said selective deactivating means being means for rotating said end stops.

32. The stabilizer of claim 24, said selective deactivating means being means for moving said end stops axially toward and away from said spring means.

33. The stabilizer of claim 24, said selective deactivating means being means for rotating said end stops to move said end stops axial toward and away from said spring means.

34. The stabilizer of claim 33, said selective deactivating means including a lever connected to each said end stop.

35. The stabilizer of claim 24, said selective deactivating means including a cable and a lever connected to said cable, said cable being connected to said end stops.

36. The stabilizer of claim 24, said selective deactivating means including a motor for rotating said end stops.

37. The stabilizer of claim 24, said selective deactivating means including hydraulic actuators connected to said end stops.

38. A vehicle stabilizer comprising:
a housing having first and second end caps on opposite ends thereof, said housing being rotatable relative to said end caps;
a fixed end secured relative to said first end cap;
a movable end connected to an axially movable rod, said rod extending through said second end cap and into said housing;
a resilient member disposed on said rod in said housing;
end stops at opposite ends in said housing;
first and second washers on said rod at opposite ends of said resilient member between said end stops and opposite ends of said resilient member;

said end stops being connected to said housing and having an opening axially there in, said openings in said end stops each including a central portion and spaced channels outwardly from said central portion;

said first and second washers having peripheral shapes including lobes, said peripheral shapes being of size and configuration to slide into said openings in said end stops with said housing and said end stops in one rotated position, and said peripheral shapes being of size and configuration to abut said end stops with said housing and said end stops in an other rotated position.

39. The stabilizer of claim 38, including a handle on said housing.

40. The stabilizer of claim 38, including a gear on said housing, a drive motor and a drive gear connected to said drive motor, said drive gear being engaged with said gear on said housing.

41. The stabilizer of claim 38, including a cable connected to said housing and a lever connected to said cable.

* * * * *